US006594365B1

(12) United States Patent
Eatwell

(10) Patent No.: US 6,594,365 B1
(45) Date of Patent: Jul. 15, 2003

(54) ACOUSTIC SYSTEM IDENTIFICATION USING ACOUSTIC MASKING

(75) Inventor: Graham P. Eatwell, Annapolis, MD (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 09/195,294

(22) Filed: Nov. 18, 1998

(51) Int. Cl.[7] .......................... H04R 3/02; H04B 15/00; G10K 11/16; G10L 19/00; G10L 21/02; G10L 15/20

(52) U.S. Cl. .................... 381/73.1; 381/71.1; 381/71.2; 381/71.8; 381/71.14; 381/94.1; 381/94.2; 704/200.1; 704/226; 704/227; 704/228; 704/233

(58) Field of Search ............................... 381/73.1, 71.1, 381/71.2, 71.8, 71.14, 94.1, 94.2; 704/200.1, 226–228

(56) References Cited

U.S. PATENT DOCUMENTS 4,438,526 A * 3/1984 Thomalla ................... 381/73.1
4,677,676 A 6/1987 Eriksson .................. 381/71.11
4,947,435 A 8/1990 Taylor ..................... 381/71.12
5,091,953 A * 2/1992 Tretter ..................... 381/71.12
5,402,495 A * 3/1995 Kim .......................... 381/94.1
5,469,087 A * 11/1995 Eatwell ....................... 327/40
5,475,761 A 12/1995 Eatwell ...................... 381/71.1
5,499,302 A 3/1996 Nagami et al. ............ 381/71.4
5,524,057 A 6/1996 Akiho et al. ............. 381/71.11
5,553,153 A 9/1996 Eatwell ................... 381/71.11
5,625,745 A * 4/1997 Dorward et al. ............ 704/227

FOREIGN PATENT DOCUMENTS

EP 0 712 115 A2 5/1996
GB 2 122 052 A 1/1984

OTHER PUBLICATIONS

European Search Report dated Jun. 20, 2002, from Application No. EP 99 30 2391.

* cited by examiner

*Primary Examiner*—Minsun Oh Harvey
*Assistant Examiner*—Laura A. Grier
(74) *Attorney, Agent, or Firm*—Harness, Dickey & Pierce, P.L.C.

(57) ABSTRACT

A system for identifying a model of an acoustic system in the presence of an external noise signal is disclosed. The system includes an acoustic actuator for generating controlled sound within the acoustic system. A sensor receives the controlled sound and the external noise signal and produces a sensed signal. A control system generates a control signal in response to an error signal. The control system includes a system model for generating an estimated response signal. The control system also generates the error signal representing the difference between the sensed signal and the estimated response signal. A masking threshold generator receives the sensed signal and the error signal and produces spectral shaping parameters. A shaped signal generator for receives the spectral shaping parameters and produces a test signal which is provided as an input to the control system. A signal combining device receives the test signal and the control signal and produces an actuator drive signal for driving the acoustic actuator.

26 Claims, 6 Drawing Sheets

ACOUSTIC SYSTEM IDENTIFICATION USING ACOUSTIC MASKING

BACKGROUND OF THE INVENTION

1. Technical Field

This invention relates to the active control of noise in an acoustic system and, in particular, to the identification of a mathematical model of the acoustic system.

2. Discussion

A review of active control systems for the active control of sound is provided in the text "Active Control of Sound", by P. A. Nelson and S .J. Elliott, Academic Press, London. Most of the control systems used for active control are adaptive systems wherein the controller characteristic or output is adjusted in response to measurements of the residual disturbance or noise. If these adjustments are to improve the performance of the system, then it is necessary to know how the system will respond to any changes. This invention relates to methods for obtaining this knowledge through measurements.

Usually the active noise control system is characterized by the system impulse response, which is the time response, at a particular controller input, due to impulse at a particular controller output. This response depends upon the input and output processes of the system, such as actuator response, sensor response, smoothing and anti-aliasing filter responses, among other responses. For multi-channel systems, a matrix of impulse responses is required, one for each input/output pair. For a sampled data representation, the impulse between the $j^{th}$ output and the $i^{th}$ input at the $n^{th}$ sample will be denoted by $a_{ij}(n)$.

Equivalently, the system can be characterized by a matrix of transfer functions, which correspond to the Fourier transforms of the impulse responses. These are defined for the $k^{th}$ frequency by $$A_{ij}(k) = \sum_{n=0}^{N-1} a_{ij}(n)\exp(2ikn\pi/NT)$$

where N is an integer, the $k^{th}$ frequency is (kINT) and T is the sampling period in seconds.

The objective of system response identification is to find a mathematical model for the acoustic response of the system. The most common technique for system response identification is to send a random test signal from the controller output, and measure a response signal at the controller input. The response signal is correlated with the random test signal so as to reduce the effects of noise from other sources.

For many stochastic signals, the correlation can be estimated as a time average of products of the signals. For uncorrelated signals, the time-averaged power of the noise component will decrease in proportion to the averaging time. For example, if a test signal s(n) is used at time sample n to excite a system, the measured response y(n) will have two components. A first component r(n), which is the response to the test signal, and a second component d(n) which is due to ambient noise. The correlation, at a lag of m samples, between the measured response y(n) and the test signal s(n) is estimated by the time average over N samples, namely $$\phi_{sy}(m, N) = \frac{1}{N}\sum_{n=1}^{N} s(n-m)y(n)$$

where y(n)=r(n)+d(n).

The expected value of this correlation can be written as $$\begin{aligned}\langle\phi_{sy}(m, N)\rangle &= \frac{1}{N}\sum_{n=1}^{N}\langle s(n-m)y(n)\rangle \\ &= \frac{1}{N}\left\langle\sum_{n=1}^{N}\{s(n-m)r(n) + s(n-m)d(n)\}\right\rangle \\ &= \phi_{sr}(m) + \frac{1}{N}\phi_{ss}^{1/2}\phi_{dd}^{1/2}\end{aligned}$$

The first term on the right hand side, $$\phi_{sr}(m) = \left\langle\frac{1}{N}\sum_{n=1}^{N} s(n-m)r(n)\right\rangle,$$

is the expected value of the time-averaged product of the test signal with the response to the test signal. The second term on the right hand side, $$\frac{1}{N}\phi_{ss}^{1/2}\phi_{dd}^{1/2} = \left\langle\frac{1}{N}\sum_{n=1}^{N} s(n-m)d(n)\right\rangle,$$

is the expected value of the time-averaged product of the test signal with the noise.

The system impulse response coefficient a(m) at lag m can be estimated as $$\hat{a}(m) = \frac{\phi_{sy}(m, N)}{\phi_{ss}}.$$

The expected value of $\hat{a}(m)$ is $$\langle\hat{a}(m)\rangle = \frac{\langle\phi_{sy}(m, N)\rangle}{\phi_{ss}} = \frac{\phi_{sr}(m)}{\phi_{ss}} + \frac{1}{N}\frac{\phi_{dd}^{1/2}}{\phi_{ss}^{1/2}}.$$

The first term on the right hand side is the true value for the impulse response coefficient, the second term is an error term. Clearly the error term can be reduced either by increasing the number of samples N over which the measurement is made, or by increasing the amplitude $\phi_{ss}$ of the test signal relative to the amplitude $\phi_{dd}$ of the noise.

To obtain an accurate estimate of the system response model in a short amount of time, it is therefore necessary to use a high-level or high amplitude test signal. However, this technique is in conflict to the requirement that the sound produced by the test signal must be quiet enough that it is not objectionable, since the primary purpose of an active control system is usually to reduce noise.

Prior schemes, such as those disclosed by the current inventor in U.S. Pat. No. 5,553,153, which is incorporated by reference herein, have sought to fix the accuracy of the system response model by adjusting the spectrum of the test signal so that the ratio of the test signal response to external noise is the same at each frequency. However, the prior art does not address the problem of how to maximize the accuracy or minimize the estimation time. The problem of subjective assessment of the system is also not addressed in the prior art. Moreover, in an ideal system the sound produced by the test signal should be inaudible. In the prior systems, the test signal is clearly audible, which is unacceptable in many applications.

Therefore, a need currently exists for a technique for system response identification that maximizes the accuracy of the estimated system response model and minimizes the time taken to obtain or update the estimate. There is also a need for a technique for system response identification that uses a substantially inaudible test signal. This technique for system response identification may utilize a variety of models, including transfer function models and impulse response models.

SUMMARY OF THE INVENTION

The present invention is a system and method for identifying a mathematical model of an acoustic system in the presence of noise. The system comprises a sensor, which produces a sensed signal in response to the noise at one location within the acoustic system, an acoustic actuator for producing controlled sounds within the acoustic system, and a signal processing module. The frequency spectral content of the noise is measured from the sensed signal, and a psycho-acoustical model is used to calculate a spectral masking threshold, below which added noise is substantially inaudible. The spectral masking threshold, together with a prior estimate of the transfer function between the input to the acoustic actuator and the sensed signal, is used to calculate a desired test signal spectrum. A signal generator is used to generate a spectrally shaped, random test signal with the desired spectrum. This test signal is supplied to the acoustic actuator, thereby producing a controlled sound within the acoustic system. The spectrally shaped test signal is also used as an input to an acoustic system model of the acoustic system, which includes the acoustic actuator and sensor and any associated signal conditioning devices.

The parameters of the acoustic system model are adjusted using a correlation algorithm according to the difference between the output from the acoustic system model and the sensed signal, which is responsive to the combination of the noise and the controlled sound. The correlation algorithm is implemented by an adaptation module. The frequency spectrum of the response to the spectrally shaped test signal is at or below the masking threshold and is therefore substantially inaudible.

One object of the present invention is to provide a system and method for the identification of a mathematical model of an acoustic system using a substantially inaudible test signal.

Another object is to provide a system and method for the identification of a mathematical model of an acoustic system, which provides improved accuracy.

A further object of the present invention is to provide a system and method for the identification of a mathematical model of an acoustic system, which provides improved convergence speed.

BRIEF DESCRIPTION OF THE DRAWINGS

Additional objects, advantages and features of the present invention will become apparent from the following description and appended claims, taken in conjunction with the accompanying drawings in which:

DETAILED DESCRIPTION OF THE PREFERRED EMBODIMENTS

Figure 1:
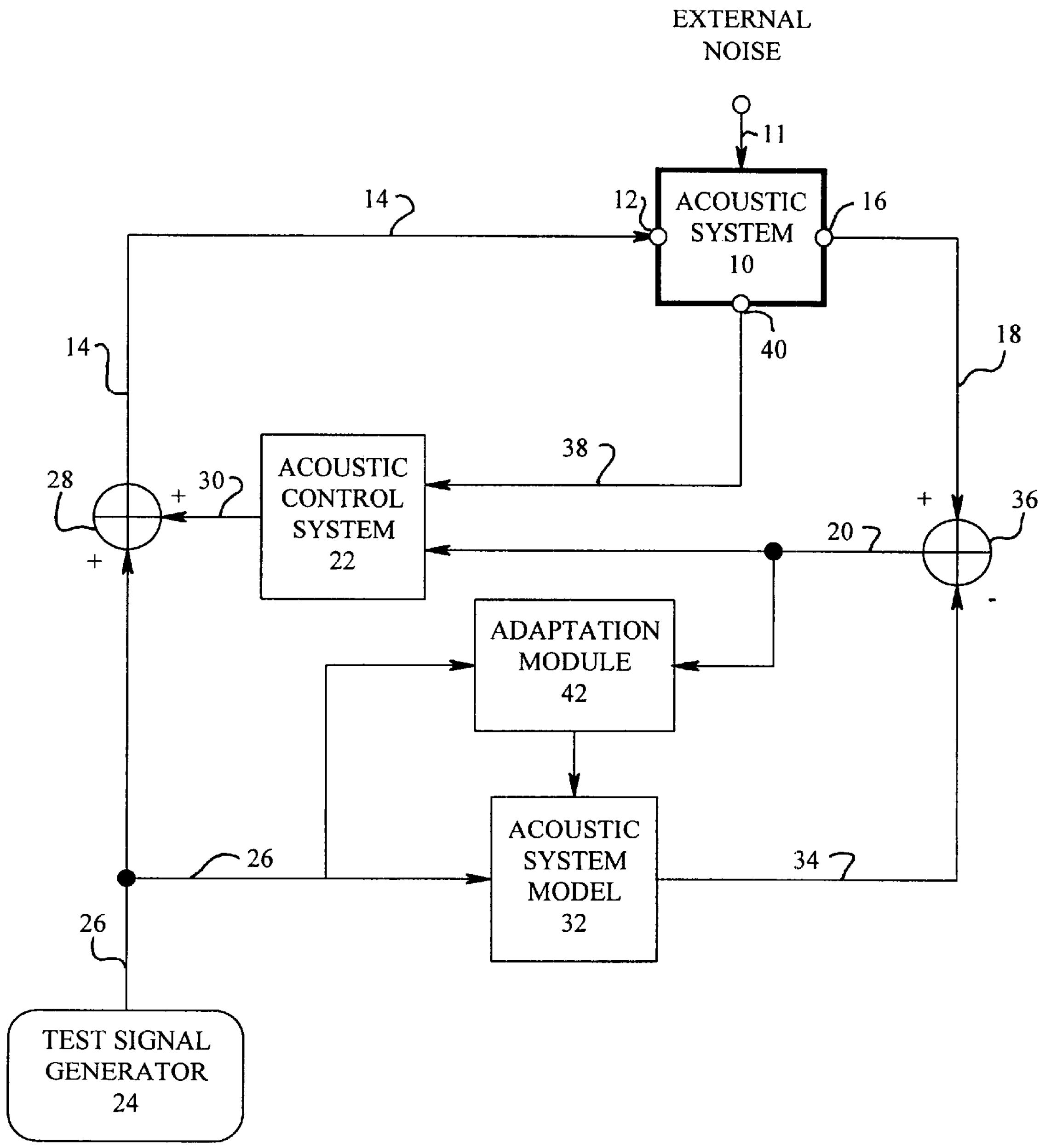
FIG 1 (PRIOR ART)
FIG. 1 is a block diagram of an active control system of the prior art, which incorporates on-line system identification.

In an active sound control system, such as that shown in FIG. 1, an acoustic system 10 is subject to external noise sources 11. An acoustic actuator 12, preferably a loud speaker driven by an actuator drive signal 14, is used to generate a controlled sound that interferes destructively with an unwanted noise. For example, the controlled sound may be an anti-noise signal having the same amplitude, yet 180 degrees out of phase with the unwanted noise signal. In an adaptive system, the residual noise is measured by a sensor 16, (usually a microphone), to produce a sensed signal 18. An error signal 20, derived from the sensed signal 18, is used to adjust the characteristics of the acoustic control system 22.

Two examples of control systems that can be used with the present invention include U.S. Pat. No. 5,091,953 to Tretter which describes a multiple channel control system for periodic noise based on the discrete Fourier transform (DFT), and U.S. Pat. No. 5,469,087 to Eatwell which describes a control system using harmonic filters. Both of these control systems estimate the amplitude and phase of the residual noise at each of the harmonic frequencies of the noise source. The amplitudes of the residual noise may be used in the present invention as is described in more detail below.

In order to make the requisite noise adjustment it is usually necessary to determine how the controlled acoustic system 10 will respond to the new controller output. It is therefore necessary to form a mathematical model of the acoustic system, known as a system response model, so that the response to a given controller output produced by the acoustic control system 22 can be determined.

In the system shown in FIG. 1, this system response model is obtained by using a test signal generator 24 to generate a test signal 26 that is combined at signal combiner 28 with a control system output signal 30 to form the actuator drive signal 14. The test signal 26 is also supplied to an acoustic system model 32 to produce an estimated response signal 34. The estimated response signal 34 is subtracted from the residual signal or sensed signal 18 at combiner 36 to form the error signal 20. The acoustic control system 22 is responsive to the error signal 20 and, optionally, to one or more reference signals 38 from reference sensors 40. The effect of the control system output signal 30, which is represented in the actuator drive signal 14 is to drive the acoustic actuator 12 so as to modify the noise in acoustic system 10.

The error signal 20 is correlated with the test signal 26 in adaptation module 42 and is used to adjust or adapt the parameters of the acoustic system model 32. The correlation algorithm serves to reduce the effects of noise from sources other than the test signal 26. The correlation algorithm performed by adaptation module 42 as applied to the present invention is described in greater detail below.

Ideally, the response to the test signal should be inaudible, since the goal of an active sound control system is usually to reduce an unwanted noise. In order to produce a test signal that results in a substantially inaudible response, the current invention utilizes the concept of "acoustic masking", which will now be described.

It is well known that it is more difficult to hear speech in the presence of noise, even if the noise is at different frequencies (for example a loud, low-frequency rumble or a high pitched screech). The ability of one sound to reduce the audibility of another sound is called acoustic masking. The amount of masking is the amount by which the threshold of audibility must be increased in the presence of the masking noise. This concept is described in "Fundamentals of Acoustics", L. E. Kinsler et al., third edition, Wiley, 1982. Generally, the amount of masking of a signal by a tone decreases according to the difference in frequencies.

In perceptual coding of audio signals, the signal is divided into a number of critical frequency bands (see Cox et al. "On the Application of Multimedia Processing to Communications", Proceedings of the IEEE, Vol. 86, No. 5, May 1998, pp. 773–774). Here, empirical rules for calculating a masking threshold are given.

In a critical frequency band B, a tone with energy $E_T$ will mask noise with energy $$E_N = E_r - (14.5 + B)\ (\text{dB}),$$

while noise with energy $E_N$ will mask a tone with energy $$E_r = E_N - K\ (\text{dB}),$$

where K has been assigned values in the range of 3–6 dB. A variety of other empirical relationships have been used over the years. Any components of the signal falling below the threshold can be removed without causing noticeable loss in the perception of the signal. This property can be used to form a compressed representation of the signal.

These models are termed 'perceptual models' or 'psycho-acoustic models'. The psycho-acoustic model utilized with the present invention is implemented by masking spectrum generator 62 and is described in greater detail below. A variety of empirical models may be used without departing from the scope of the present invention. The present invention uses the unwanted noise from external sources 11 to mask the test signal (such as test signal 26) and thereby make it substantially inaudible. For example, if the external noise has a strong tonal component at one frequency, the level of the test signal at nearby frequencies can be set relative to this level. Even if the response to the test signal at these nearby frequencies is much higher than the external noise level at these frequencies, the test signal will still be inaudible because of the acoustic masking property. This is a considerable improvement over prior schemes in which the test signal level was chosen with regard only to external noise at the same frequency. In the present invention, the test signal at the nearby frequencies is louder, enabling the system response model to be estimated more accurately and significantly faster.

Figure 2:
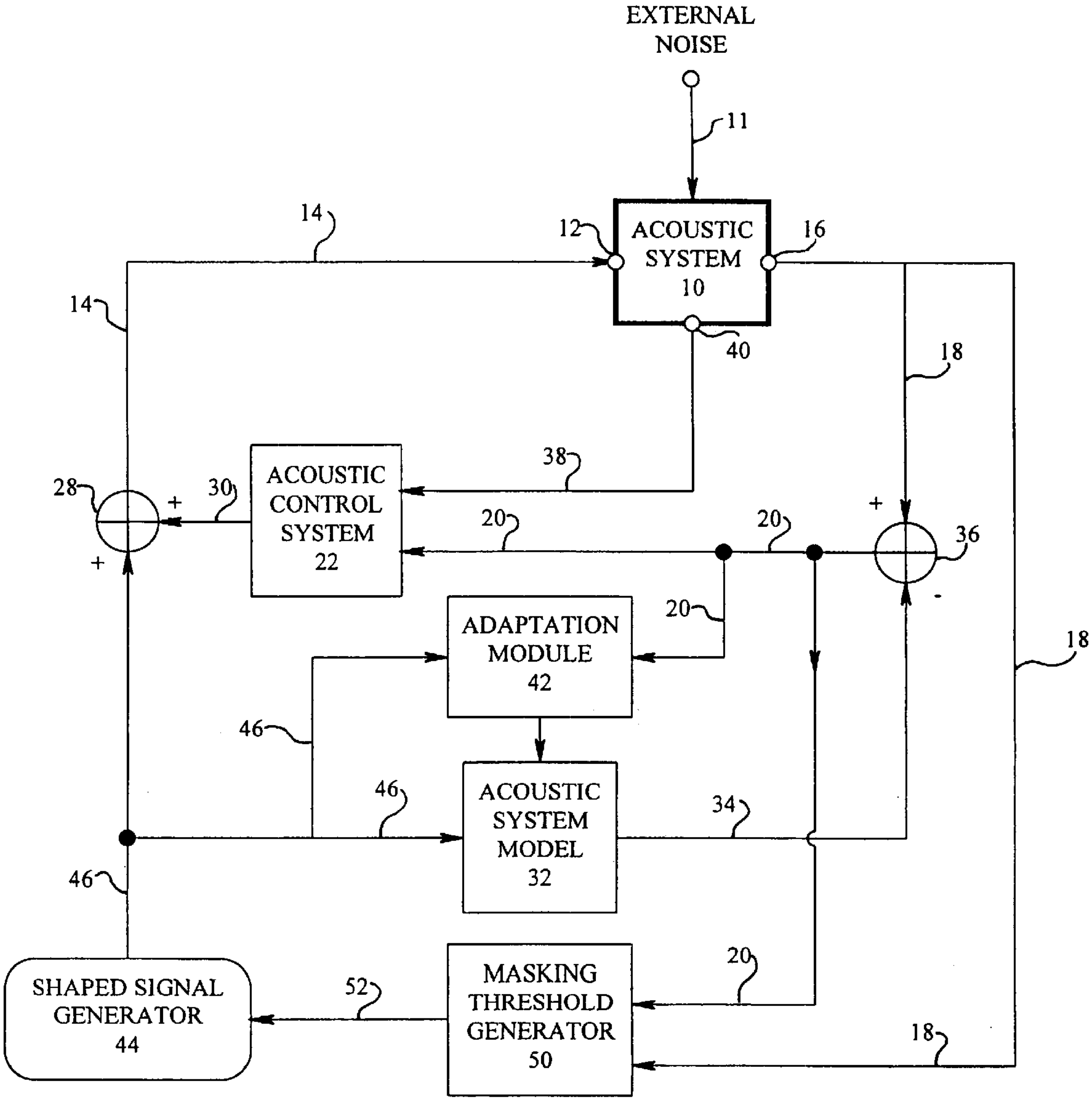
FIG. 2 is a block diagram of an active control system which incorporates improved on-line system identification in accordance with a preferred embodiment of the present invention.

A block diagram of the present invention is shown in FIG. 2. The basic operation of the common functional blocks is similar to the system described in FIG. 1, except that the test signal 26 is replaced a spectrally shaped test signal 46. The shaped signal generator 44 produces the spectrally shaped test signal 46. This spectral shaping of test signal 46 is continually updated to ensure that the sound due to the spectrally shaped test signal is masked by the external noise 11. The sensed signal 18, from the sensor or microphone 16, is passed to a masking threshold generator 50. The masking threshold generator 50 is used to estimate spectral shaping parameters 52 utilized by the shaped signal generator 44 for generating the spectrally shaped test signal 46. The masking threshold generator 50 utilizes a perceptual model of hearing. In one embodiment the masking threshold generator 50 is also responsive to an estimated response signal 34 generated by the acoustic system model 32.

The spectrally shaped test signal 46 is combined by signal combiner 28 with the control signal 30 produced by the acoustic control system 22 to form the actuator drive signal 14. The shaped test signal 46 is also supplied to an acoustic system model 32 to produce the estimated response signal 34. The estimated response signal 34 is subtracted from the sensed signal 18 at signal combiner 36 to form the error signal 20. The acoustic control system 22 is responsive to the error signal 20 and, optionally, signals 38 from reference sensors 40. The effect of the actuator drive signal 14 is to drive the acoustic actuator 12 so as to modify the noise in the acoustic system 10.

The error signal 20 is correlated with the spectrally shaped test signal 46 in adaptation module 42 and is used by the adaptation module 42 to adjust or adapt the parameters of the acoustic system model 32. The correlation function serves to reduce the effects of noise from sources other than the spectrally shaped test signal 46. Many time or frequency domain adaptation schemes (for implementation by adaptation module 42) are known in the prior art, including the Least Mean Square (LMS) algorithm of Widrow (B. Widrow and S. D. Stearns, "Adaptive Signal Processing", Chapter 6, Prentice Hall, 1985), and the frequency domain algorithms described by J. J. Shynk ("Frequency Domain and Multirate Adaptive Filtering", IEEE Signal Processing Magazine, January 1992, pages 14–37).

For example, in the time-domain LMS algorithm scheme, each impulse response coefficient a(m) is updated according to $$r(n) = \sum_j a^{(k)}(j)s(n-j)$$

where s(n) is the test signal, y(n) is the measured response, r(n) is the estimated response and $\mu$ is a positive parameter which may be scaled according to the level of the test signal.

In a simple frequency domain update scheme, the transfer function A(f) at frequency f is updated according to $$A^{(k+1)}(f) = A^{(k)}(f) + \mu\frac{S^*(f)(Y(f) - R(f))}{|S(f)|^2},$$

where S(f) is the transform of the test signal, Y(f) is the transform of the measured response, R(f) is the transform of the estimated response and $\mu$ is a positive parameter. Further adaptation schemes are described in copending U.S. patent application Ser. No. 09/108,253, filed on Jul. 1, 1998, which is incorporated herein by reference.

Figure 3:
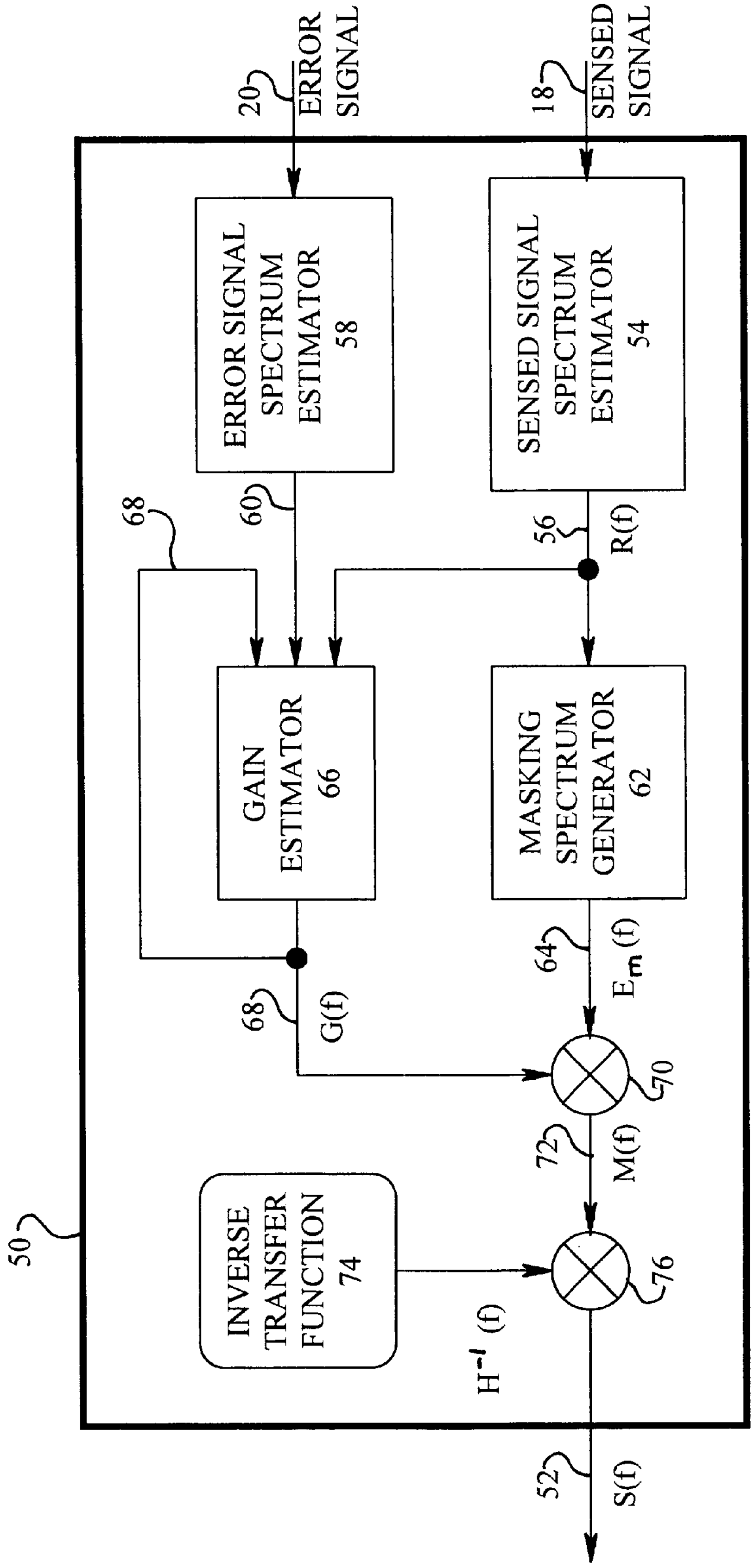
FIG. 3 is a block diagram of a masking threshold generator according to the teachings of the present invention.

The operation of the masking threshold generator 50 of the present invention will now be described with reference to the embodiment shown in FIG. 3. The frequency spectrum 56 of sensed signal 18 is estimated by the sensed signal spectrum estimator 54. This may be a broadband frequency spectrum or a harmonic frequency spectrum. The frequency spectrum 56 is used by masking spectrum generator 62 to calculate an initial spectral masking threshold 64. The initial spectral masking threshold 64 is optionally multiplied by spectral gains 68 (produced by gain estimator 66) at multiplier 70 to produce a modified or scaled spectral masking threshold 72. This scaled spectral masking threshold 72 is further scaled by an inverse transfer function 74 at multiplier 76 to produce the spectral shaping parameters 52 as an output of the masking threshold generator 50.

The inverse transfer function 74 is set a set of stored values (for each frequency) and represents the gain or attenuation that must be applied to the spectrally shaped test signal 46 to compensate for the response of the acoustic system 10. The values are not required to a high accuracy, unlike the transfer function used by the controller of the acoustic control system 22.

The initial spectral masking threshold 64 represents the spectrum of a test signal that would produce the desired response at the sensor 16, that is a response that will be acoustically masked by the ambient sound. However, the accuracy of this initial spectral masking threshold 64 depends on estimates of the inverse transfer function 74 and the ambient noise level; neither of which is known with certainty.

The frequency spectrum 56 of sensed signal 18 contains energy produced by the spectrally shaped test signal 46 and by the external noise sources 11. It may therefore be necessary to modify the initial spectral masking threshold 64 at some frequencies to account for this. In the embodiment shown in FIG. 3, this modification is achieved by scaling the initial spectral masking threshold 64 by spectral gains 68 generated by gain estimator 66.

The purpose of the spectral gain 68 is to compensate for errors in the estimate of the inverse transfer function 74 or the ambient noise level. It has been described above how the transfer function accuracy depends upon the ratio of the test signal level (as measured at the sensor) to the ambient noise level. Hence, if the transfer function accuracy is poor it is likely because (a) the test signal level is too low or (b) the acoustic system response has changed. In either case it desirable to increase the level of the test signal in order to improve accuracy. This improvement in accuracy is achieved by multiplying the spectrum by a gain factor, such as spectral gains 68 which are generated by the gain estimator 66. The gain factor is increased if the transfer function accuracy is thought to be too low, and decreased if it is higher than necessary (so as to minimize the level of the test signal).

The spectral gains 68 are calculated by gain estimator 66 according to the power spectrum 60 of the error signal 20, which is calculated by the error signal spectrum estimator 58, and according to the frequency spectrum 56 from sensed signal spectrum estimator 54. This may be a recursive calculation, which also depends on previous gains 68 from gain estimator 66.

Figure 4:
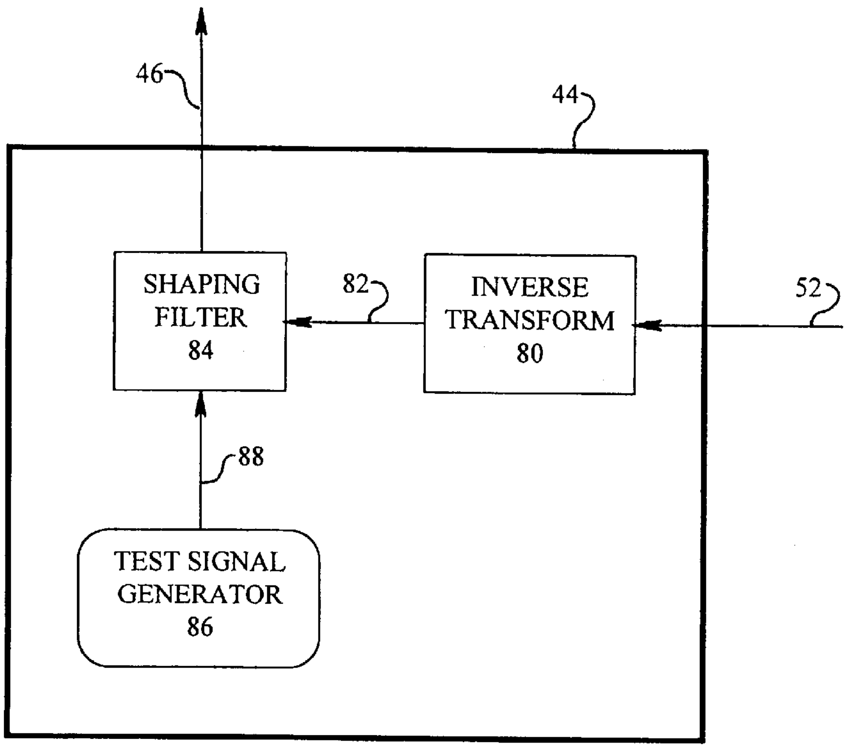
FIG. 4 is a block diagram of a time-domain, shaped test signal generator in accordance with the present invention.

Two embodiments of the shaped test signal generator 44 will now be described with reference to FIGS. 4 and 5. FIG. 4 shows a time-domain, shaped test signal generator 44. The spectral shaping parameters 52 are supplied to inverse transform block 80 to produce the coefficients 82 for a time-domain shaping filter 84. A test signal generator 86 produces a pseudo-random signal 88 with substantially equal energy in each frequency band. This signal is passed through the shaping filter 84 to produce the spectrally shaped test signal 46.

Figure 5:
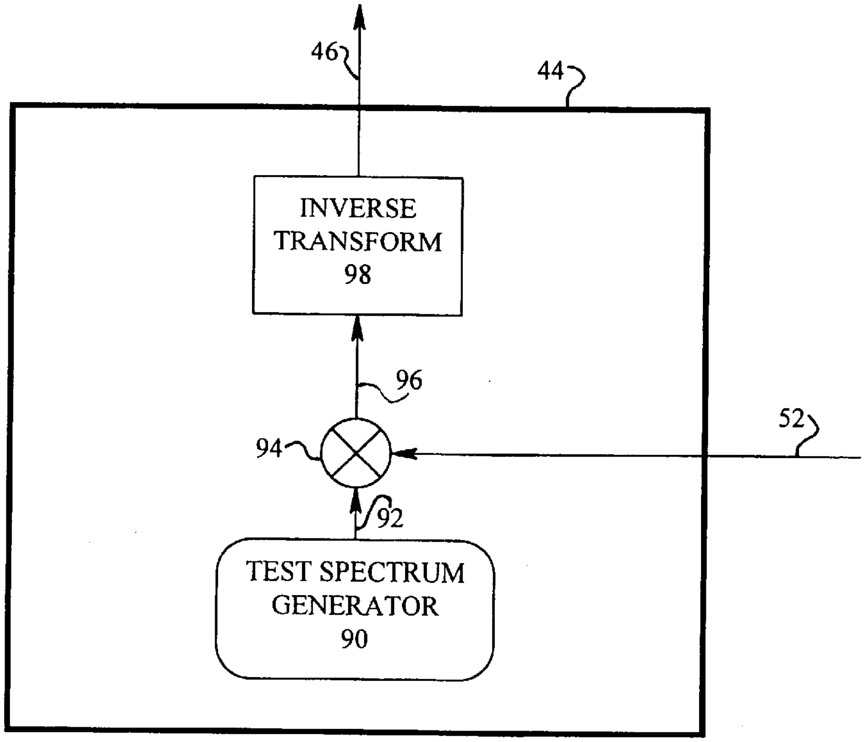
FIG. 5 is a block diagram of a frequency-domain, shaped test signal generator in accordance with the present invention.

FIG. 5 shows a frequency domain, shaped test signal generator 44'. A test spectrum generator 90 generates a complex frequency spectrum 92 with uniform amplitude and random phase. This complex frequency spectrum 92 is multiplied by spectral shaping parameters 52 at multiplier 94 to produce the spectrum of the shaped test signal 96. An inverse transform is applied at block 98 to produce the spectrally shaped test signal 46. Further detailed description of the various elements associated with the system of the present invention is provided below.

The function provided by the masking threshold generator 50 of the present invention can be modeled as follows. The sensed signal 18 in FIG. 3, at time sample n is denoted by r(n). The Fourier transform of r(n) is calculated by the sensed signal spectrum estimator 54. The transform may be calculated as:

$$R(f)\cdot\exp(i\phi(f))=\sum_{n=0}^{N-1}r(n)\exp(2\pi inTf),$$

where N is the transform block size and T is the sampling period. The Fourier transform at frequency f is denoted by R(f).exp(iφ(f)), where R(f) is the amplitude of the spectrum and φ(f) is the phase of frequency spectrum 56.

In one embodiment of the invention the initial spectral masking threshold 64 at frequency f is given by $$E_M(f)=\max_{f_0}\{E(f,f_0)\},$$

where $$E(f,f_0)=\begin{cases}R(f_0)\cdot 10^{-(K+\alpha(f-f_0)/f_0)}, & f>f_0\\ R(f_0)\cdot 10^{-(K+\beta(f-f_0)/f_0)}, & f\le f_0\end{cases}$$

The parameters K, α and β may be adjusted to control the amount of masking modeled. In the preferred embodiment, the initial spectral masking threshold 64 is calculated by the masking spectrum generator 62 using this psycho-acoustical model above.

The spectral gain adjustment performed by the masking threshold generator 50 is described as follows. The initial spectral masking threshold $E_m(f)$ 64 may optionally be multiplied by spectral gains G(f) 68 (produced by gain estimator 66) at multiplier 70 to produce a scaled or modified spectral masking threshold $M(f)=G(f)E_M(f)$ 72.

The frequency spectrum 56 of the sensed signal 18 is given by $$R(f)=D(f)+H(f)S(f),$$

Where D(f) is spectrum of the residual external noise and H(f) is the transfer function of the acoustic system 10.

The spectrum 60 of the error signal 20 is:

$$F(f)=D(f)+h(f)S(f),$$

where h(f) is the error in the transfer function. The ratio of the sensed signal frequency spectrum 56 to the error signal spectrum 60, at frequency f, is given by $$\Gamma(f)=\frac{R(f)}{F(f)}=\frac{D(f)+H(f)S(f)}{D(f)+h(f)S(f)}=\frac{D(f)+M(f)}{D(f)+M(f)h(f)/H(f)}$$

In general, a large value of the amplitude of Γ(f) indicates that H(f) (the transfer function) is large compared to h(f) (the error in the transfer function). In one embodiment of the present invention the spectral gain 68 is adjusted by the gain estimator block 66 so that the amplitude of the ratio Γ(f) is maintained above some minimum level for frequencies between the discrete frequencies.

Compensation for the system transfer function is accomplished by the masking threshold generator 50 as follows. The sound due to the spectrally shaped test signal 46 will be modified by the transfer function of the acoustic system 10 (including the actuator response function, the sensor response function and acoustic propagation). The initial spectral masking threshold 64 must be modified accordingly to compensate for this transfer function. The detailed transfer function is not known, since this is what the invention seeks to identify, but the general form of the transfer function is usually known from previous measurements, or from knowledge of the acoustic system 10. For active noise control, the phase of the transfer function is generally more important than the amplitude, since the adaptation rate may always be reduced to compensate for amplitude errors.

The prior estimate or measurement of the transfer function, at frequency f, is denoted as H(f). The inverse $H^{-1}$(f) of the transfer is stored at block 74 and is multiplied by the scaled or modified spectral masking threshold 72 by multiplier 76 to give the spectral shaping parameters 52

$$S(f)=H^{-1}(f)G(f)E_M(f).$$

Finally, a minimum level may be set for S(f) in order to prevent underflow errors or errors due to non-linearities in the acoustic system. This minimum level may be set relative to the largest value of S(f).

Figure 6:
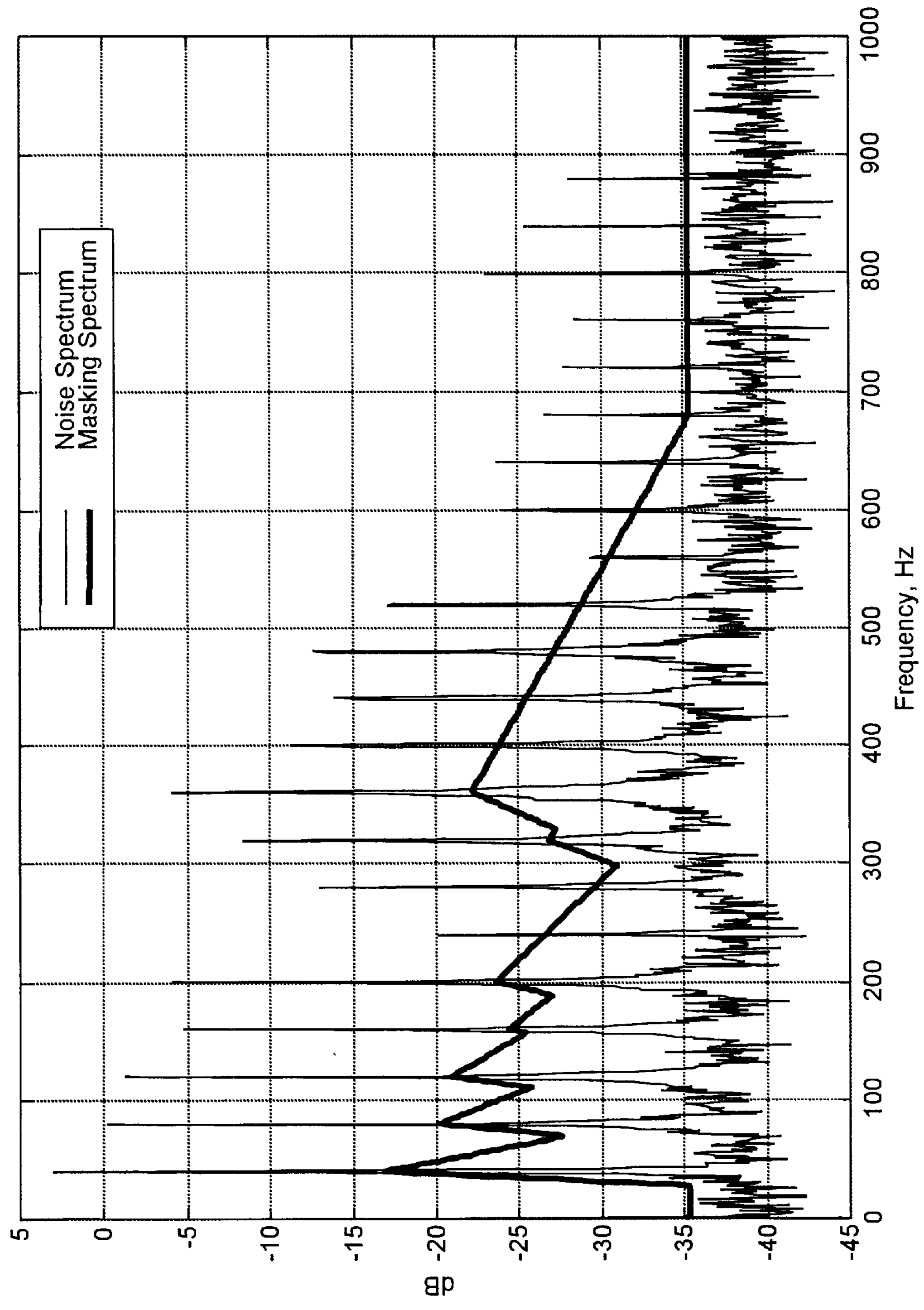
FIG. 6 is a graph depicting an example noise spectrum and a corresponding masking spectrum derived according to one embodiment of the invention.

One important application of the present invention is for identifying the response of dynamic systems subject to periodic or tonal disturbances. The external disturbance of the system is characterized by a frequency spectrum that contains sound power in discrete, narrow frequency bands. An example of a noise spectrum resulting from such a disturbance is shown in FIG. 6. FIG. 6 shows the amplitude of the external noise 11 in decibels (dB) as a function of frequency measured in Hertz. In this example, the fundamental frequency of the external noise 11 is 40 Hz. The spectral masking threshold or spectral shaping parameters 52, shown as the heavier line in FIG. 6, has sound power across a broad frequency range. In this example of the invention the spectral masking threshold 52 at frequency f is given by $$E_M(f)=\max_{f_0}\{E(f,f_0)\},$$

where $$E(f,f_0)=\begin{cases}R(f_0)\cdot 10^{-(K+\alpha(f-f_0)/f_0)}, & f>f_0\\ R(f_0)\cdot 10^{-(K+\beta(f-f_0)/f_0)}, & f\le f_0\end{cases},$$

and K=0.1, α=0.75 and β=3.

At the discrete frequencies of the external noise 11 the spectral masking threshold 52 is about 20 dB below the frequency spectrum of the external noise. Between the discrete frequencies, the spectral masking threshold 52 is considerably higher than the frequency spectrum of the external noise 11. However, a spectrally shaped test signal 46 shaped by the spectral masking threshold 52 will still be substantially inaudible. The prior art system response identification systems use a test signal 26 that is set at each frequency according to the noise at that same frequency. The resulting signal is produced at a much lower amplitude level than that used in the present invention. Although the spectrally shaped test signal 46 used in the present invention is louder, it is masked by the nearby discrete tone and is therefore substantially inaudible. Accordingly, at frequencies between the discrete frequencies, the shaped test signal 46 of the present invention is loud compared to the external noise 11, enabling a very rapid identification of the acoustic system model 32.

Figure 7:
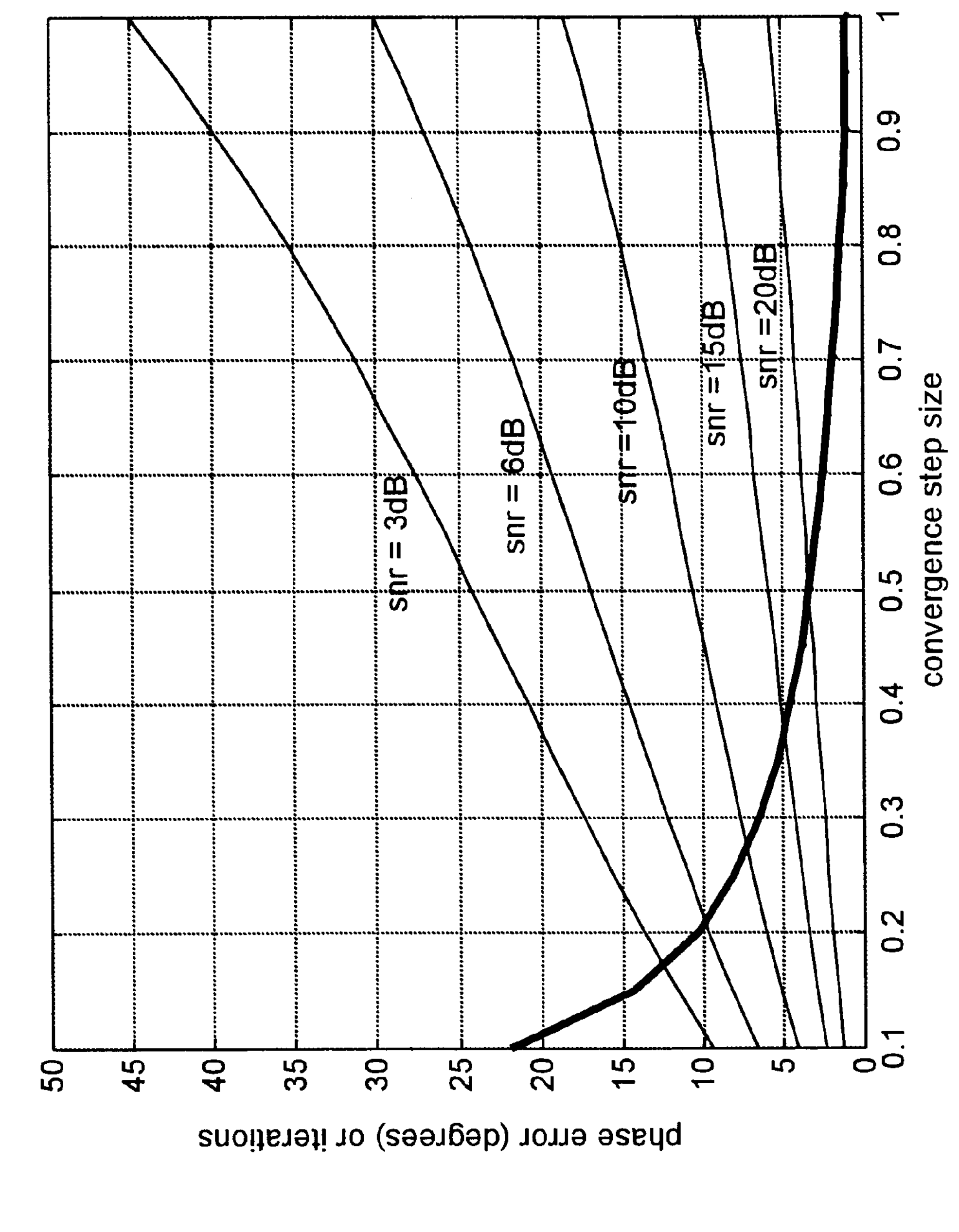
FIG. 7 is a graph depicting the relationship between convergence time and signal-to-noise ratio for a system response identification system.

There is a direct relationship between the signal-to-noise ratio (i.e. the ratio of the test signal amplitude to the external noise amplitude) and the convergence time or accuracy of the acoustic system model 32. The acoustic system model 32 is identified using an adaptive algorithm implemented within the adaptation module 42 in which the change to the model at each iteration of the algorithm is proportional to the misadjustment and to a convergence step size. The time taken to identify the acoustic system model 32 is related to the step size as shown in FIG. 7. FIG. 7 shows the number of iterations (i.e. the time) for a model to converge to within 10% of its final estimate as a function of the convergence step size. The number of iterations is reduced as the convergence step size is increased until, finally, only a single iteration is required. Unfortunately, the error in the final estimate of the system response increases with the convergence step size. This error also depends upon the signal to noise ratio. FIG. 7 also shows the relationship between the convergence step size and the phase error in the estimated transfer function of the acoustic system model 32 for several different signal-to-noise ratios. The performance of the resulting control system is strongly dependent upon this phase error.

In order to achieve a desired accuracy it is necessary to increase the signal-to-noise ratio or decrease the convergence rate. The current invention provides a technique by which much higher signal-to-noise ratios may be used (between the discrete frequencies), and therefore increases the accuracy of the resulting acoustic system model 32 and/or reduces the time required to estimate the acoustic system model 32.

At the discrete frequencies, the transfer function of the acoustic system model 32 may be estimated via interpolation from nearby frequencies. In the preferred embodiment, the frequencies to be interpolated are determined by measuring the frequencies of the noise or the repetition rate of the machine (using a tachometer for example). Alternatively, a joint estimation of the external noise d(n) 11 and the acoustic system model 32 can be made as described in co-pending U.S. patent application Ser. No. 09/108,253, filed on Jul. 1, 1998. When the external disturbance is periodic, as in this example, the adaptation of the acoustic system model 32 is preferably performed in the frequency domain, so that the noise at the discrete frequencies does not degrade the adaptation process.

The discussion presented herein discloses and describes exemplary embodiments of the present invention. One skilled in the art will readily recognize from such discussion, and from the accompanying drawings and claims, that various changes, modifications, and variations can be made therein without departing from the spirit and scope of the invention as defined in the following claims.

What is claimed is:

1. A system for identifying a model of an acoustic system in the presence of an external noise signal, comprising:

an acoustic actuator for generating controlled sound within the acoustic system;

a sensor for receiving the controlled sound and the external noise signal and producing a sensed signal;

a control system for generating a control signal, the control system including a system model for generating an estimated response signal, the control system generating an error signal representing the difference between the sensed signal and the estimated response signal;

a masking threshold generator for receiving the sensed signal and the error signal and producing spectral shaping parameters;

a shaped signal generator for receiving the spectral shaping parameters and producing a test signal; and a signal combining device for receiving the test signal and the control signal and producing an actuator drive signal for driving the acoustic actuator.

2. The system of claim 1 wherein the control system further includes an adaptation module for controlling the system model.

3. The system of claim 2 wherein the adaptation module performs a correlation algorithm on the spectrally shaped test signal and provides the result to the system model.

4. A system for identifying a model of an acoustic system in the presence of external noise, comprising:

an acoustic actuator for generating controlled sound within the acoustic system, said acoustic actuator being responsive to an actuator drive signal which includes a spectrally shaped test signal;

a sensor responsive to a combination of the controlled sound and the external noise at a location within the acoustic system, said sensor producing a sensed signal;

a masking threshold generator for determining a spectral masking threshold, said masking threshold generator being responsive to said sensed signal;

a test signal generator responsive to said spectral masking threshold for generating said spectrally shaped test signal;

an acoustic system model responsive to said spectrally shaped test signal and producing an estimated response signal;

signal subtraction means for producing an error signal which is the difference between said sensed signal and said estimated response signal; and adaptation means for adjusting the parameters of said acoustic system model to minimize said error signal, said adaptation means being responsive to said spectrally shaped test signal and to said error signal, wherein the sound generated in response to said spectrally shaped test signal is substantially masked by said external noise.

5. The system of claim 4 wherein said masking threshold generator is also responsive to at least one of a prior estimate of the transfer function and an inverse transfer function of said acoustic system, and wherein said spectrally shaped test signal is modified to compensate for a transfer function of the acoustic system.

6. The system of claim 5 further including:

a control system responsive to said error signal and producing a control signal; and signal combining means for combining said control signal and said spectrally shaped test signal to produce said actuator drive signal, wherein said actuator drive signal modifies the external noise in said acoustic system.

7. The system of claim 6 wherein said control signal is adjusted to minimize the mean square error of the error signal.

8. The system of claim 7 further including a sensor for producing a reference signal which is time-related to the external noise, and wherein said control system is also responsive to said reference signal.

9. A system for identifying a model of an acoustic system in the presence of an external noise, comprising:

an acoustic actuator for generating controlled sound within the acoustic system, the acoustic actuator being responsive to an actuator drive signal which includes a spectrally shaped test signal;

a sensor for producing a sensed signal, the sensor being responsive to a combination of the controlled sound and the external noise at a location within the acoustic system;

a masking threshold generator for determining a spectral masking threshold, the masking threshold generator being responsive to the sensed signal;

a shaped test signal generator for generating the spectrally shaped test signal, the shaped test signal generator being responsive to the spectral masking threshold level;

an acoustic system model for receiving the spectrally shaped test signal and producing an estimated response signal; and a signal subtraction device for producing an error signal, the error signal being the difference between the sensed signal and the estimated response signal;

wherein the controlled sound generated in response to the spectrally shaped test signal is substantially masked by the external noise.

10. The system of claim 9 wherein the test signal generator implements a time domain algorithm for producing the test signal.

11. The system of claim 10 wherein the time domain algorithm includes a shaping filter.

12. The system of claim 11 wherein the frequency domain algorithm includes an inverse transform function.

13. The system of claim 9 wherein the test signal generator implements a frequency domain algorithm for producing the test signal.

14. The system of claim 9 wherein the acoustic system model includes an adaptation module for providing adjustment parameters to the acoustic system model.

15. The system of claim 14 wherein the adaptation module receives the spectrally shaped test signal and the error signal and performs a correlation function for generating the adjustment parameters.

16. The system of claim 9 wherein the masking threshold generator calculates a Fourier transform of the sensed signal for producing a sensed signal frequency spectrum.

17. The system of claim 16 wherein the masking threshold generator includes a masking spectrum generator for receiving the sensed signal frequency spectrum and producing an initial spectral masking threshold representing signal parameters below which sound produced by the spectrally shaped test signal within the acoustic system will be masked by the external noise.

18. The system of claim 17 wherein the masking threshold generator includes an inverse transfer function module for storing inverse transfer function parameters relating to the transfer function of the acoustic system, and wherein the inverse transfer function parameters are applied to the initial spectral masking threshold for producing the spectral masking threshold level provided to the shaped test signal generator.

19. The system of claim 17 wherein the masking threshold generator includes a gain estimator for receiving the sensed signal frequency spectrum and producing a spectral gain signal, the gain estimator implementing a spectral gain calculation function based upon a transfer function of the acoustic system.

20. The system of claim 19 wherein the spectral gain signal is combined with the initial spectral masking threshold for producing the spectral masking threshold level provided to the shaped test signal generator.

21. A method for identifying a model of an acoustic system in the presence of external noise, comprising the steps of:

generating a test signal;

generating an actuator signal which includes said test signal;

supplying said actuator signal to an acoustic actuator for generating a controlled sound within the acoustic system;

sensing a combination of the external noise and the controlled sound at one location within the acoustic system to obtain a sensed signal;

determining the frequency spectrum of the external noise from said sensed signal;

using a psycho-acoustical model to calculate an initial spectral masking threshold from said frequency spectrum, below which added sound is substantially inaudible;

modifying said initial spectral masking threshold to compensate for the transfer function between the input to the acoustic actuator and the sensed signal to produce a modified spectral masking threshold;

adjusting a frequency spectral content of said test signal to be at or below said modified spectral masking threshold;

inputting said test signal to an acoustic system model; and adjusting the parameters of said acoustic system model according to an error signal which is the difference between the output from the acoustic system model and the sensed signal, whereby the controlled sound is substantially inaudible and the characteristics of said acoustic system model approach the characteristics of the acoustic system.

22. The method of claim 21 including the steps of:

generating a control signal in response to the error signal; and adjusting said control signal to minimize the error signal, wherein said actuator signal is generated by combining said control signal and said test signal.

23. The method of claim 22 wherein said control signal is also responsive to a reference signal which is time-related to the external noise.

24. The method of claim 21 wherein the parameters of said acoustic system model are system transfer function values and are adjusted according to a frequency domain algorithm.

25. The method of claim 24 wherein the external noise is predominately at discrete frequencies and in which the system transfer function values at discrete frequencies of the external noise are obtained by interpolation from values at nearby frequencies.

26. The method of claim 24 wherein the frequency spectral content of said test signal is further adjusted so as to maintain the ratio of the frequency spectrum of the sensed signal to the frequency spectrum of the error signal above a specified level for frequencies between the discrete frequencies of the external noise.

* * * * *